(12) United States Patent
Bashford et al.

(10) Patent No.: US 8,751,718 B2
(45) Date of Patent: Jun. 10, 2014

(54) APPARATUS AND METHODS FOR A SIMPLIFIED, MULTI-CLIENT SAS PORT FOR MANAGEMENT OF OTHER DEVICES IN AN ENHANCED SAS DEVICE

(75) Inventors: Patrick R. Bashford, Fort Collins, CO (US); Timothy E. Hoglund, Colorado Springs, CO (US)

(73) Assignee: LSI Corporation, Milipitas, CA (US)

( * ) Notice: Subject to any disclaimer, the term of this patent is extended or adjusted under 35 U.S.C. 154(b) by 0 days.

(21) Appl. No.: 11/374,359

(22) Filed: Mar. 13, 2006

(65) Prior Publication Data

US 2007/0226757 A1    Sep. 27, 2007

(51) Int. Cl.
*G06F 13/14* (2006.01)

(52) U.S. Cl.
USPC ........... 710/305; 710/100; 710/113; 710/300; 710/306; 710/309; 719/326

(58) Field of Classification Search
USPC .......................................................... 710/62
See application file for complete search history.

(56) References Cited

U.S. PATENT DOCUMENTS

| | | | | |
|---|---|---|---|---|
| 5,802,306 | A * | 9/1998 | Hunt | 709/228 |
| 6,904,596 | B1 * | 6/2005 | Clark et al. | 719/310 |
| 7,039,710 | B2 * | 5/2006 | Khartabil | 709/227 |
| 7,058,749 | B2 * | 6/2006 | Loffink | 710/313 |
| 7,958,273 | B2 * | 6/2011 | El-Batal | 710/2 |
| 7,958,295 | B1 * | 6/2011 | Liao et al. | 710/244 |
| 2002/0141370 | A1 * | 10/2002 | Abrol et al. | 370/338 |
| 2004/0081178 | A1 * | 4/2004 | Fujimori | 370/401 |
| 2004/0186918 | A1 * | 9/2004 | Lonnfors et al. | 709/250 |
| 2004/0190554 | A1 * | 9/2004 | Galloway | 370/474 |
| 2004/0243680 | A1 * | 12/2004 | Mayer | 709/206 |
| 2005/0071532 | A1 * | 3/2005 | Bakke et al. | 710/300 |
| 2005/0080881 | A1 * | 4/2005 | Voorhees et al. | 709/220 |
| 2005/0108452 | A1 * | 5/2005 | Loffink | 710/74 |
| 2005/0125574 | A1 * | 6/2005 | Foster et al. | 710/36 |
| 2006/0041672 | A1 * | 2/2006 | Day et al. | 709/230 |
| 2006/0101171 | A1 * | 5/2006 | Grieff et al. | 710/36 |
| 2006/0136666 | A1 * | 6/2006 | Pang et al. | 711/114 |
| 2006/0136688 | A1 * | 6/2006 | Pang et al. | 711/162 |
| 2006/0156055 | A1 * | 7/2006 | Cherian et al. | 714/4 |
| 2006/0194386 | A1 * | 8/2006 | Yao et al. | 438/257 |
| 2007/0070994 | A1 * | 3/2007 | Burroughs et al. | 370/381 |
| 2007/0283119 | A1 * | 12/2007 | Sarkar et al. | 711/170 |
| 2009/0313411 | A1 * | 12/2009 | Stenfort | 710/306 |
| 2012/0185626 | A1 * | 7/2012 | Stuhlsatz et al. | 710/105 |

OTHER PUBLICATIONS

Serial Attached SCSI Architecture by Rob Elliott, Hewlett Packard, Sep. 30, 2003.*

(Continued)

*Primary Examiner* — Steven Snyder
(74) *Attorney, Agent, or Firm* — Duft Bornsen & Fettig LLP; Gregory T. Fettig

(57) ABSTRACT

Apparatus and associated methods for a simplified multi-client initiator/target within a SAS device. Features and aspects hereof provide a simplified initiator/target component to enable cost reduction and simplification of SAS devices requiring only limited initiator/target functionality. In one embodiment, a SAS expander may incorporate simplified SSP/STP/SMP initiator/target features and aspects hereof to permit simple management of devices coupled to the expander or coupled downstream through other expanders. The simplified multi-client initiator/target suffices for simple management functions while reducing cost and complexity of the SAS expander. Features and aspects hereof may be implemented with shared circuits for each of multiple client protocols coupled with firmware operable in a general or special purpose processor embedded in the SAS device.

9 Claims, 14 Drawing Sheets

(56) References Cited

OTHER PUBLICATIONS

Serial Attached SCSI General Overview by Rob Elliott, Hewlett Packard, Sep. 30, 2003.*

Working Draft Section 7 SL Changes' by George Penokie (IBM/Tivoli), T10 Committee (SCSI), Feb. 22, 2003.*

'Serial Attached SCSI' Standard 1.1, T10/1601-D, Mar. 13, 2004.*

* cited by examiner (SMP initiator)

(SSP initiator)

(SSP initiator)

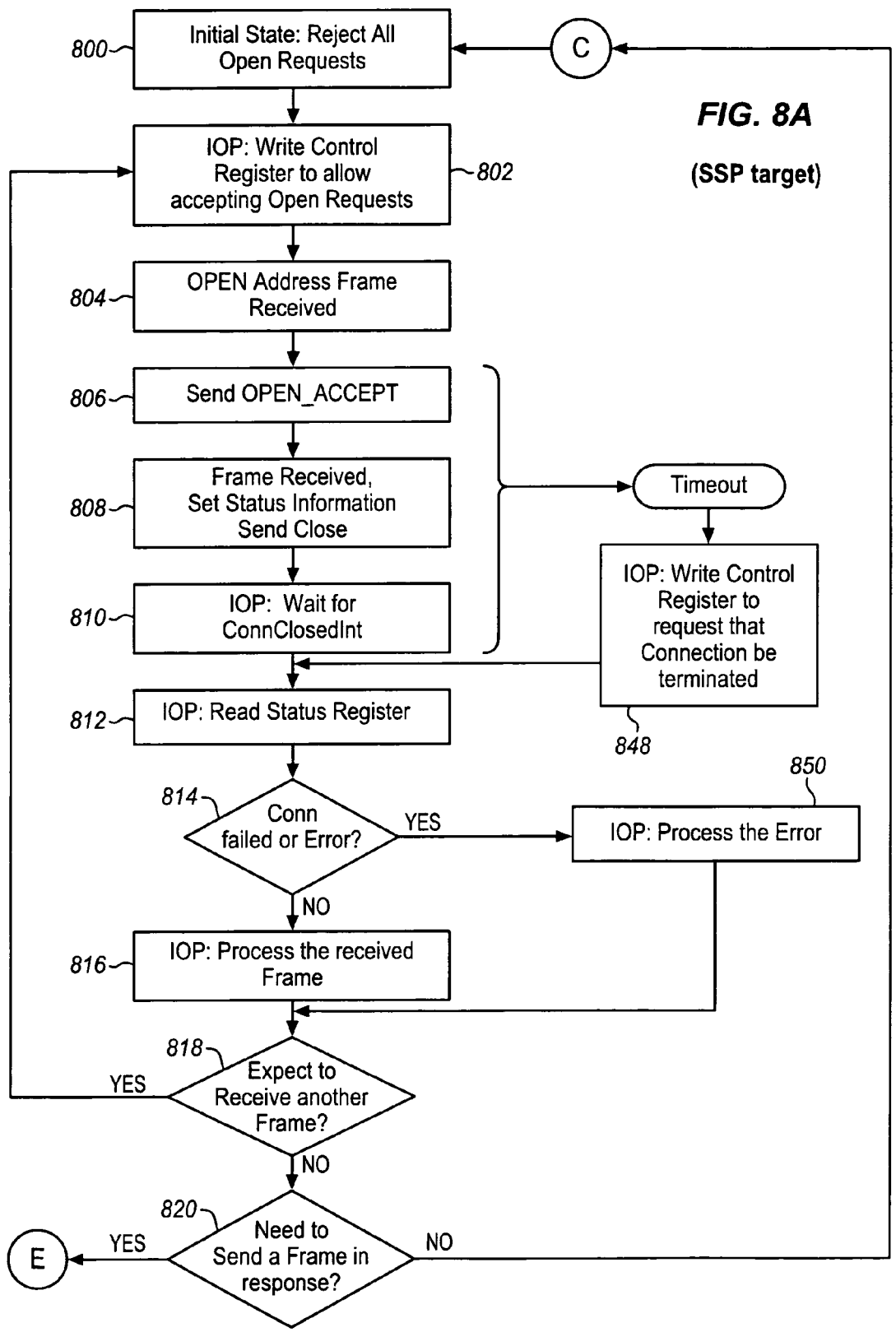

(SSP target)

(STP initiator)

(STP initiator)

APPARATUS AND METHODS FOR A SIMPLIFIED, MULTI-CLIENT SAS PORT FOR MANAGEMENT OF OTHER DEVICES IN AN ENHANCED SAS DEVICE

RELATED PATENTS

This patent application is related to, commonly owned, U.S. patent application Ser. No. 11/374,260 (now U.S. Pat. No. 7,529,877 issued May 5, 2009) filed concurrently herewith and entitled APPARATUS AND METHODS FOR SIMPLIFIED SSP LINK LAYER PROCESSING which is hereby incorporated by reference (hereinafter referred to as the "Sibling" patent).

BACKGROUND OF THE INVENTION

1. Field of the Invention

The invention relates generally to serial attached SCSI ("SAS") domains and more specifically to apparatus and methods for a simplified multi-client initiator/target within a SAS device providing reduced features coupled with reduced cost and complexity.

2. Discussion of Related Art

Small Computer Systems Interface ("SCSI") is a set of American National Standards Institute ("ANSI") standard electronic interface specifications that allow, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the websites www.t10.org, www.t13.org, and www.serialata.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

The SAS standard defines the Serial Attached SCSI (SAS) interconnect and three transport protocols that use the SAS interconnect: a) Serial SCSI Protocol (SSP): a mapping of SCSI supporting multiple initiators and targets (see, e.g., section 7.16 of the SAS specifications); b) Serial ATA Tunneled Protocol (STP): a mapping of Serial ATA expanded to support multiple initiators and targets (see, e.g., section 7.17 of the SAS specifications); and c) Serial Management Protocol (SMP): a management protocol (see, e.g., section 7.18 of the SAS specifications).

Each defined protocol includes initiator and target aspects of the defined exchanges. In a number of particular device applications, the full richness and flexibility of an SSP, STP, and/or SMP initiator operable in accordance with the respective link layer specifications is not required. For example, in a SAS expander device that utilizes STP exchanges only for limited management of SATA devices attached to the expander or attached downstream from the expander, a fully featured STP initiator capability is not required. Rather, only a relatively small subset of the full STP feature set is used for such a limited management purpose. In like manner, other management functions within a SAS device may use limited features of the full richness of the SSP and SMP protocols. A SAS expander is an example of such a SAS device where limited aspects of each protocol may be required for certain management and administrative features implemented within the expander in dealing with attached devices.

However, current initiator and target circuits provide only a fully featured initiator and/or target capability intended primarily for other applications requiring full featured SAS device support for all SAS related protocols. Such a fully featured SAS initiator including SSP/STP/SMP initiator/target features is costly and complex in such an application though only a small fraction of the features are actually required. Further, where multiple such initiator/target circuits are required within a SAS device (such as a SAS expander), the cost and complexity is multiplied by the total number of such managerial ports required.

It is evident from the above discussion that a need exists for a simplified initiator and target circuit supporting multiple simplified protocols useful in applications that do not require fully featured initiator/target capabilities.

SUMMARY OF THE INVENTION

The present invention solves the above and other problems, thereby advancing the state of the useful arts, by providing apparatus and methods for a simplified initiator/target circuit and methods of operation thereof useful in a variety of SAS devices that do not require a fully featured SAS protocol initiator/target function. For example, in one embodiment, an enhanced SAS expander may incorporate a simplified, multi-client initiator/target component in accordance with features and aspects hereof to reduce cost and complexity of the SAS expander while still providing adequate SSP/STP/SMP initiator/target support for the required device management or other management functions.

A first feature hereof provides a multi-client initiator/target apparatus within a SAS device, the apparatus comprising: a plurality of client application interface components each supporting a SAS client protocol; and a multi-client SAS port circuit coupled to the plurality of client application interface components and adapted to manage a subset of SAS exchanges.

Another aspect hereof further provides that the SAS link layer includes: an arbiter for controllably coupling the SAS port circuit to a selected client application of the plurality of client application interfaces.

Another aspect hereof further provides that the SAS port circuit includes: a multi-client buffer coupled to each of the plurality of client application interfaces adapted to store a frame with an attached device; a transport layer circuit coupled to the multi-client buffer and adapted to manage transport protocol exchanges for a selected client of the plurality of client application interfaces; a link layer circuit coupled to the transport layer and adapted to manage link protocol exchanges for a selected client of the plurality of client application interfaces; and a physical layer circuit coupled to the multi-client buffer and adapted to manage physical link protocol exchanges for a selected client of the plurality of client application interfaces.

Another aspect hereof further provides that the plurality of client application interfaces each comprises multiple clients selected from the group consisting of: SSP initiator client; SSP target client; STP initiator client; STP target client; SMP initiator client; and SMP target client.

Another aspect hereof further provides that the SAS device is a SAS expander.

Another aspect hereof further provides for a processor; and a program memory coupled to the processor for storing programmed instructions and corresponding data to be used by the processor, and provides that the processor is operable in conjunction with each of the plurality of client application interfaces and with the multi-client SAS port circuit to perform the subset of SAS exchanges.

Another feature hereof provides a SAS expander comprising: a plurality of SAS device management client applications; a plurality of SAS client application interfaces each associated with a corresponding SAS device management protocol and adapted to exchange information through a single SAS logical port controllably coupled to another device; and a single SAS port circuit coupled to each of the plurality of SAS client application interfaces and adapted to perform SAS transport layer, SAS link layer, and SAS physical layer exchanges on behalf of a currently selected SAS device management application.

Another aspect hereof further provides that the single SAS port circuit further comprises: a memory buffer adapted to permit shared access by any of the plurality of SAS client application interfaces.

Another aspect hereof further provides that the memory buffer further comprises a segmented memory buffer having a plurality of segments each designated for use as an inbound buffer to receive a frame for a corresponding one of the plurality of client application interfaces or designated for use as an outbound buffer for storing a frame to be transmitted on behalf of a corresponding one of the plurality of client application interfaces.

Another aspect hereof further provides that the single SAS link layer further comprises: an arbiter adapted to selectively couple a selected client of the plurality of SAS client application interfaces to the single SAS link layer to transmit a SAS frame therethrough to an attached device.

Another aspect hereof further provides that the single SAS link layer further comprises: inbound frame logic adapted to identify a client application of the plurality of client applications to which a received frame is to be applied.

Another aspect hereof further provides that the inbound frame logic further comprises: open address frame processing logic adapted to analyze a received SAS Open Address Frame to determine the identified client application from information received in the SAS Open Address Frame; and frame steering logic to route a received frame to a buffer associated with the identified client application.

Another aspect hereof further provides that the plurality of client application interfaces each comprises multiple clients selected from the group consisting of: SSP initiator client; SSP target client; STP initiator client; STP target client; SMP initiator client; and SMP target client.

Another aspect hereof further provides that the SAS port circuit further comprises: a shared transport logic layer coupled to each of the plurality of client application interfaces for managing SAS transport layer exchanges in conjunction with each of said plurality of client application interfaces.

Another aspect hereof further provides that the SAS port circuit further comprises: a shared logic layer coupled to the shared transport logic layer and adapted to implement the XL and SL state machine models for SAS physical and link layer exchanges in conjunction with each of said plurality of client application interfaces.

Another feature provides a method operable in a SAS expander to exchange information for purposes of managing other SAS devices coupled to the SAS expander, the method comprising: detecting a need to exchange management information with another SAS device using an identified SAS protocol; selecting a client application interface that supports the identified SAS protocol from among a plurality of client application interfaces within the SAS expander such that the management information will be exchanged with said another SAS device through the selected client application interface; and completing the exchange of the management information using a shared SAS port element selectively coupled to the selected client application interface.

Another aspect hereof further provides that the step of completing further comprises: using a shared transport layer logic module and a shared link layer logic module and a shared physical layer logic module all within the shared SAS port element to complete the exchange of the management information between the SAS device and the selected client application interface.

Another aspect hereof further provides for that the shared SAS port includes a buffer for storage of SAS frames, and provides that the step of completing further comprises: exchanging one or more frames with said another device using a portion of the buffer associated with the selected client application interface.

Another aspect hereof further provides that the step of selecting further comprises: arbitrating among the plurality of client application interfaces to controllably grant temporary exclusive access to the shared SAS port by the selected client application interface.

Another aspect hereof further provides that the step of completing further comprises: routing a received frame from said another device to the selected client application interface through the shared SAS port.

DETAILED DESCRIPTION OF THE DRAWINGS

Figure 1:
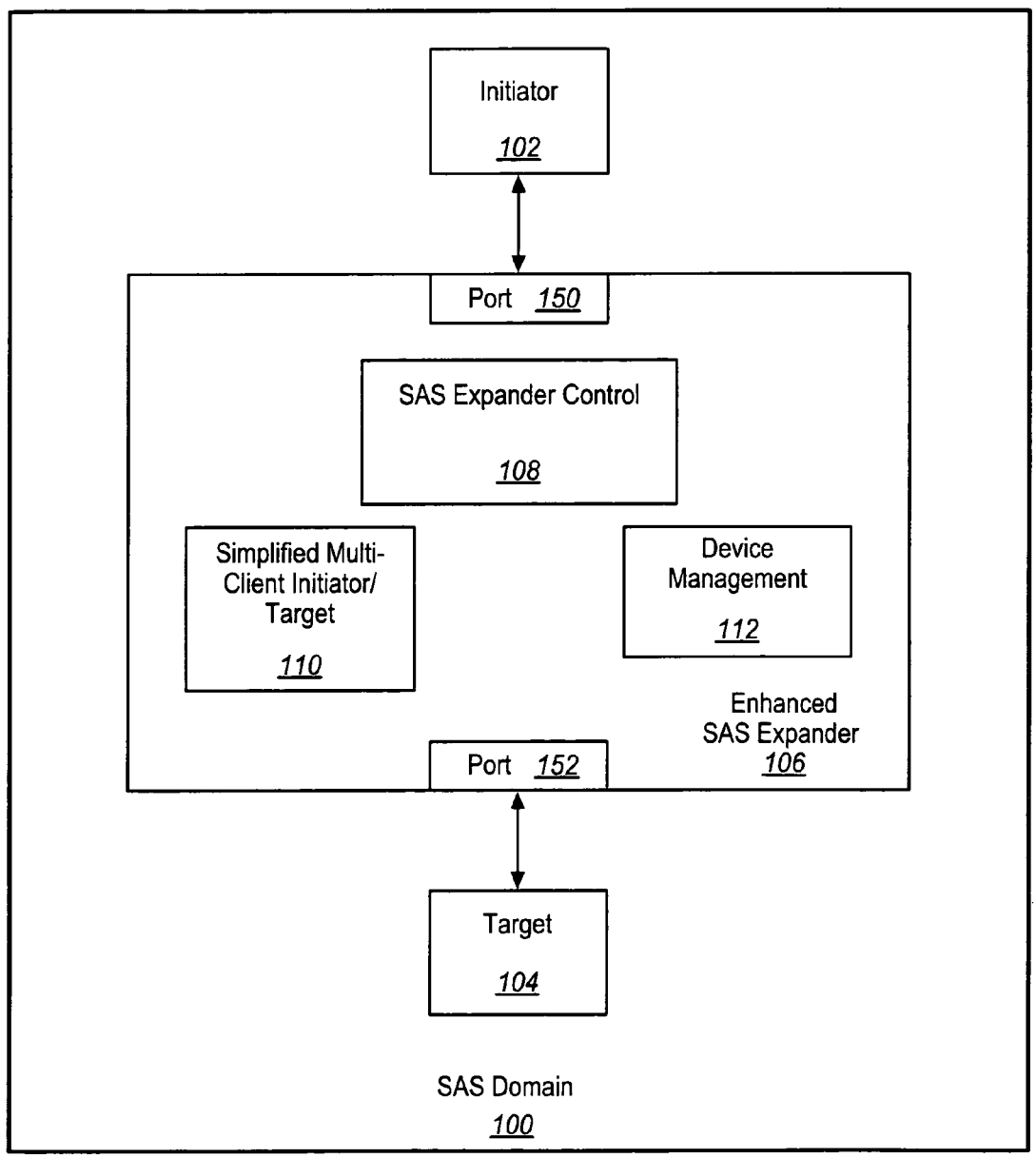
FIG. 1 is a block diagram of a system (A SAS domain) including an exemplary SAS expander enhanced in accordance with features and aspects hereof to provide a simplified, multi-client initiator/target within the enhanced SAS expander.

FIG. 1 is a block diagram of a SAS domain 100 in which features and aspects hereof are advantageously applied. SAS domain 100 generally includes the one or more initiators 102 coupled through enhanced SAS expander 106. In particular, each initiator 102 is coupled through a corresponding port 150 of expander 106 and each target device 104 is coupled through a corresponding port 152. SAS expander 106 may include standard SAS expander control element 108 for performing the normal intended functions of a SAS expander as well as device management element 112 for performing certain management features for other devices coupled thereto. Exemplary of such management functions may be initial configuration and set up for devices coupled to SAS expander 106, troubleshooting of devices coupled to SAS expander 106, and re-configuration of devices coupled to expander 106. Those of ordinary skill in the art will readily recognize that any SAS device, not just a SAS expander such as 106, may be enhanced to perform such device management functions 112 to initially configure, setup, or otherwise manage devices other devices coupled thereto.

In prior SAS devices that provide device management features 112, a circuit is dedicated to each SAS protocol (SSP, STP, and SMP) and each role therein (initiator or target). Multiple such complex circuits may be required to perform desired management functions 112. Presently known SAS protocol circuits include a complete protocol stack for the associated protocol implemented in accordance with the full features specified by the SAS specifications. In some cases, a completely separate protocol stack circuit is required for the initiator role of a protocol and for the target role of the same protocol.

Figure 4:
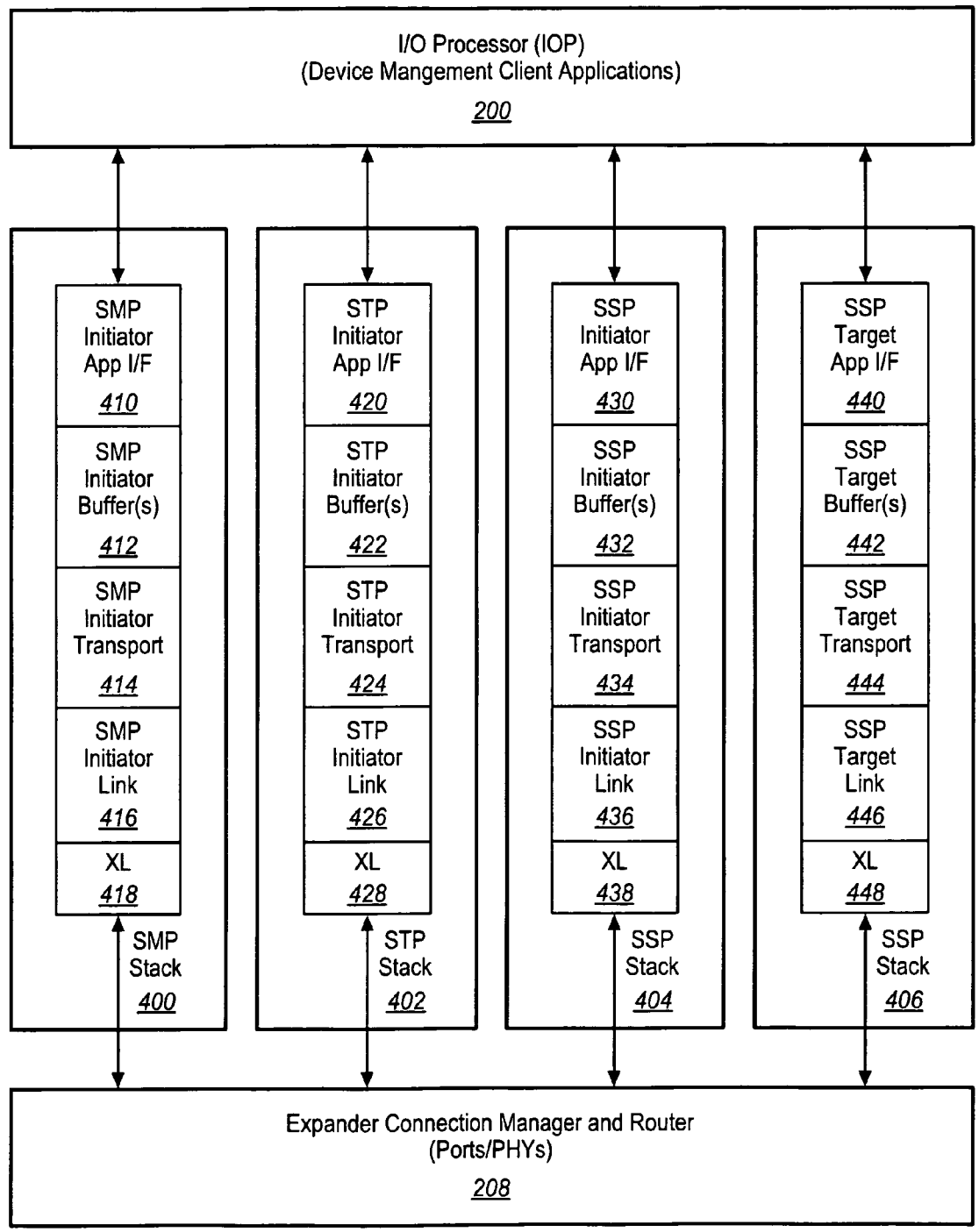
FIG. 4 is a block diagram of a typical SAS expander having management functions as presently practiced in the art in which each protocol stack used by the management functions requires a complex protocol stack circuit.

Referring now to FIG. 4, an exemplary SAS expander is shown including management functions performed generally by I/O processor 200 ("IOP"). Device management client applications may be operable as suitably programmed instructions and data within I/O processor 200 of the associated SAS device. Client applications operable in the enhanced SAS expander communicate with other SAS devices through the expander connection manager and router 208. Element 208 is generally responsible for the lowest level port and PHY management of the SAS expander.

For each device management client application operable in I/O processor 200, a corresponding protocol stack may be incorporated within the SAS expander. For example, an SMP stack 400 may be used for a first device management client application while a completely independent STP protocol stack 402 may be used for yet another device management client application. In like manner, an SSP stack 404 (operable as an initiator) and a second SSP stack 406 (operable as a target) may be included in each operable to perform a respective SSP initiator or SSP target function for a corresponding device management client application.

Each such protocol stack, (400, 402, 404, and 406) may include a corresponding application interface (410, 420, 430, and 440, respectively), may include its own buffer memory (412, 422, 432, and 442, respectively), and may include a protocol transport element (414, 424, 434, and 444, respectively). Further, each protocol stack may include a link layer component (416, 426, 436, and 446, respectively) and a physical XL layer element (418, 428, 438, and 448 respectively). The each protocol stack 400 through 406 typically corresponds to a custom or commercially available circuit integrated within the corresponding expander or other SAS device and dedicated to the particular device management client application. Such present architectures for SAS protocol features within a SAS device providing device management functionality entails significant duplication of circuitry and functions through each of the multiple protocol stacks 400 through 406.

Returning now to FIG. 1, by contrast, enhanced SAS expander 106 includes a simplified, multi-client initiator/target element 110. The simplified multi-client initiator/target element 110 provides support for multiple SAS protocols (e.g., SSP, SMP, and STP) and for multiple SAS roles in each protocol (e.g., initiator or target). The enhanced SAS expander 106 of FIG. 1 provides these features while minimizing the duplication of complex circuitry in the associated protocol stack circuits.

In general, simplified multi-client initiator/target element 110 includes a plurality of thin, simple, client application interface circuits to couple the corresponding device management application 112 to another device through the enhanced SAS expander 106. All such thin, simple client application interface circuits within simplified multi-client initiator/target element 110 share access to a common, single, simple SAS port logic circuit providing all further protocol features for coupling the associated client application to another device.

Figure 2:
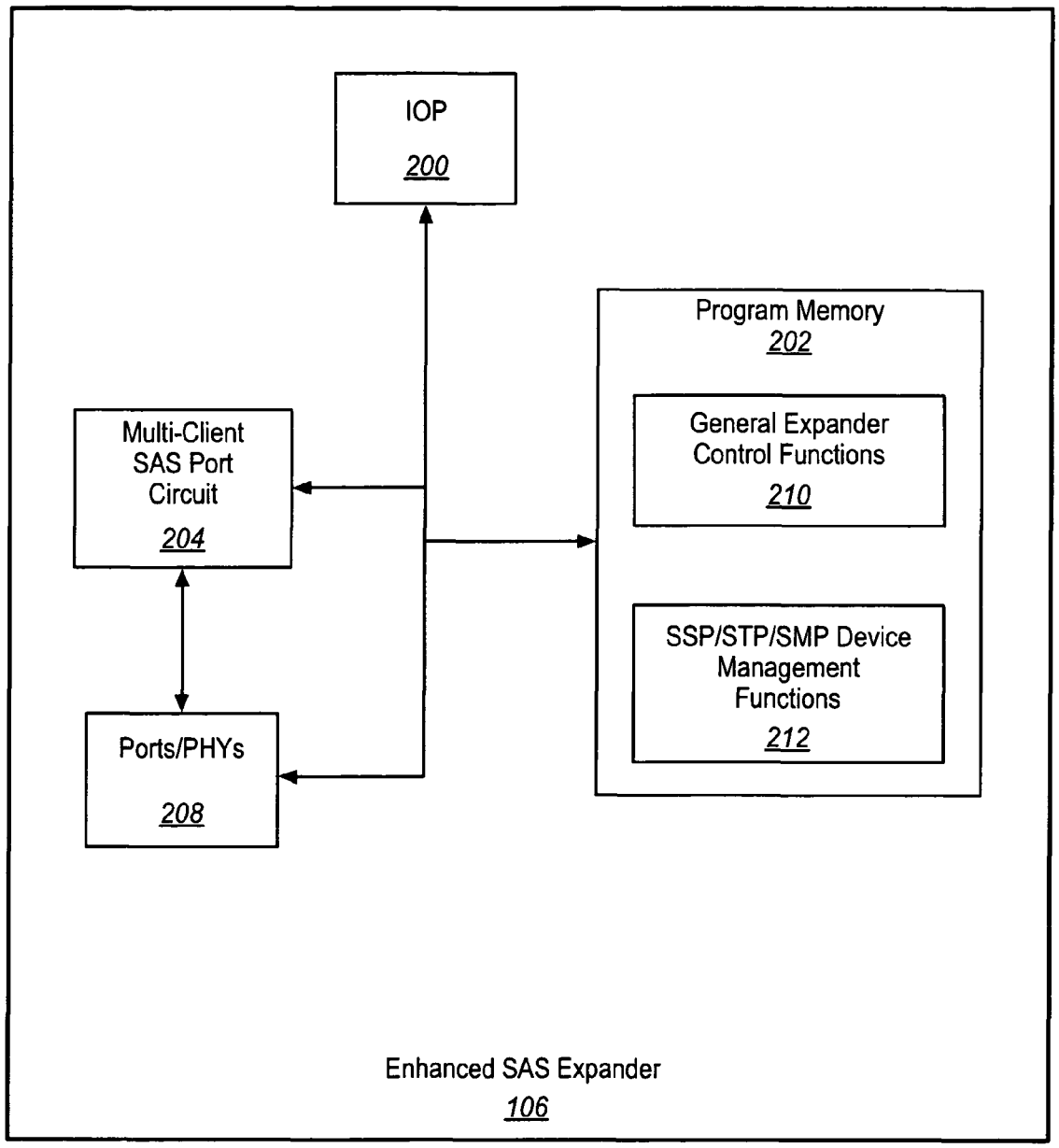
FIG. 2 is a block diagram of an enhanced SAS expander with management functions in accordance with features and aspects hereof utilizing a shared, common, multi-client SAS link layer.

FIG. 2 is a block diagram providing some additional details of an exemplary enhanced SAS expander in accordance with features and aspects hereof. An I/O processor 200 within enhanced SAS expander 106 is coupled to program memory 202 containing appropriate programmed instructions and data for performing general expander control functions 210 as well as device management functions 212 utilizing any of the standard SAS protocols (e.g., SSP, STP, and SMP). A multi-client SAS port circuit 204 is accessible by the device management functions 212 operable within IOP 200 to control management information exchanges with other devices coupled through ports or PHYs 208. As noted above, multi-client SAS port circuit 204 provides a client application interface for each of the multiple possible SAS protocols used by device management functions 212. In particular, multi-client SAS port circuit 204 may include client application interface components for any SAS protocols and roles including, for example, SSP initiator, SSP target, SMP initiator, SMP target, STP initiator, and STP target.

Figure 3:
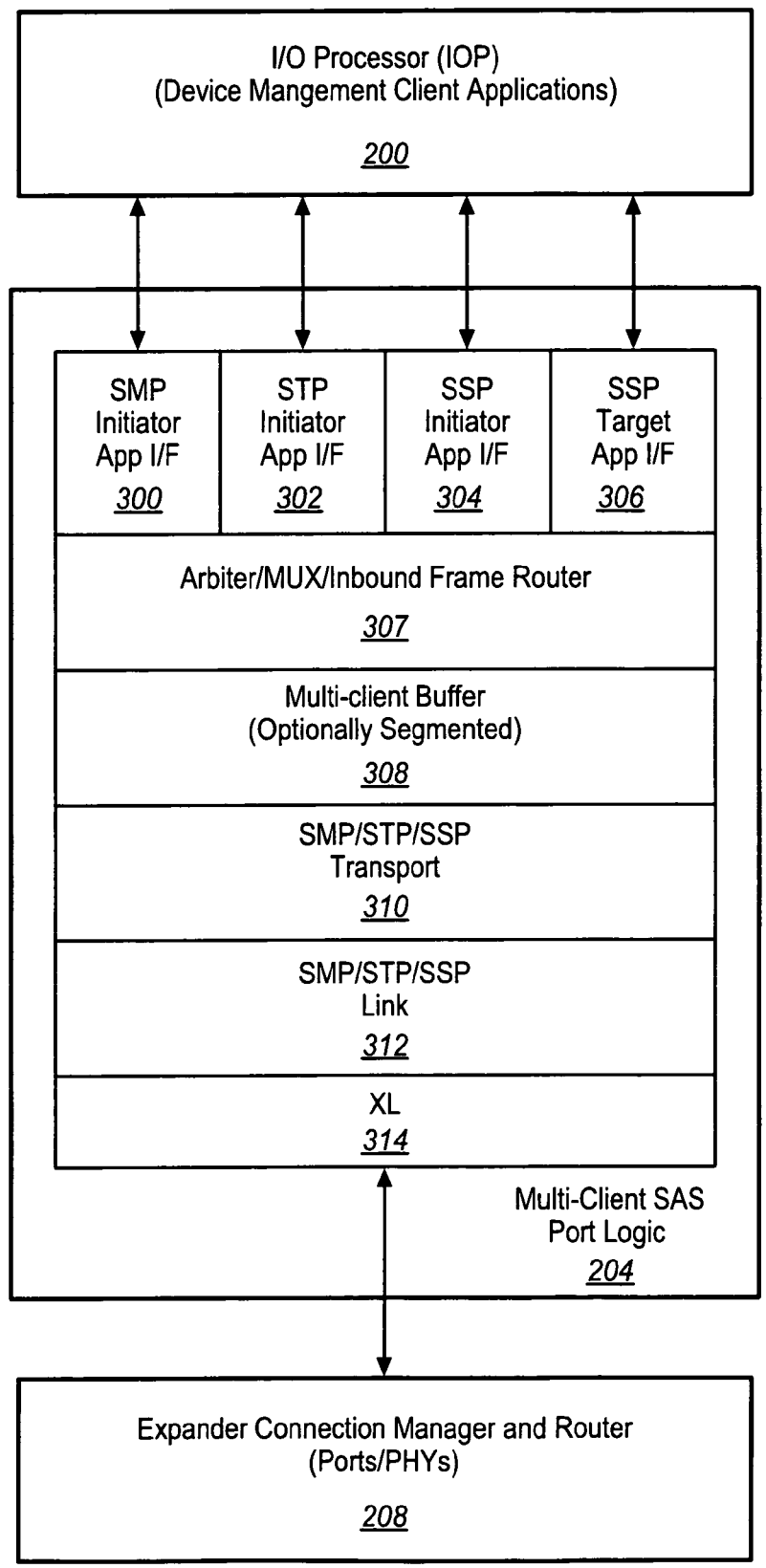
FIG. 3 is a block diagram providing additional details of an enhanced SAS device such as that of FIG. 2 where a shared SAS port logic is used by multiple client applications in accordance with features and aspects hereof.

FIG. 3 is a block diagram providing additional details of an exemplary enhanced SAS device (e.g., enhanced SAS expander) structured and operable in accordance with features and aspects hereof. Device management client applications are operable as suitably programmed instructions and data within I/O processor 200. Each such device management client application interacts with a corresponding client application interface within multi-client SAS port logic 204. The device management client application utilizing multi-client SAS port logic 204 may then communicate with an appropriate other SAS device through expander connection manager and router 208 (e.g., through corresponding ports and PHYs of the enhanced SAS device).

Multi-client SAS port logic 204 includes a plurality of client application interface elements 300 through 306 for interfacing to one or more corresponding device management client applications operable within IOP 200. As noted above, a client application interface may be provided for each of multiple SAS protocols supported by the enhanced device including, for example, SMP initiator application interface 300, STP initiator application interface 302, SSP initiator application interface 304, and SSP target application interface 306. Those of ordinary skill in the art will readily recognize that other protocols and or roles defined within the SAS specifications may be provided as corresponding client application interfaces within multi-client SAS port logic 204. Application interfaces 300 through 306 are therefore intended merely as exemplary of typical protocols and roles useful in SAS device management client application functions.

Unlike prior SAS devices incorporating management features as discussed above with respect to FIG. 4, multi-client SAS port logic 204 provides a single shared protocol stack accessed by each of the multiple client application interfaces 300 through 306. The arbiter/MUX/inbound frame router element 307 provides logic circuits to manage the cooperative operation of the multi-client SAS port logic 204 on behalf of multiple device management client applications operable within IOP 200. In particular, element 307 may include arbiter logic to arbitrate among the plurality of client application interfaces 300 through 306 when multiple such client applications simultaneously require temporary exclusive access to the shared SAS port. Element of 307 then may also include multiplexing logic components to selectively and controllably couple a selected client application to the shared the protocol stack elements of SAS port logic 204.

When such a selected client application is controllably coupled to the multi-client SAS port logic 204 inbound frame routing logic of element 307 assures that received frames from another SAS device coupled through expander connection manager and router 208 is appropriately routed to the proper client application interface and hence to the proper client application. In other words, when one client application interface is currently coupled to the shared protocol stack elements (307 through 314) an inbound frame may be directed to that currently selected client application or may be saved in an appropriate buffer until the proper client application is eventually coupled to the shared SAS port logic 204.

Shared SAS port logic 204 may include multi-client buffer 308. Buffer 308 may be a single ported memory component accessed by the plurality of client application interfaces 300 through 306 only under coordinated control of arbiter 307. Further, those of ordinary skill in the art will recognize that buffer 308 may also be multi-ported such that multiple client application interfaces and/or other components of SAS port logic 204 may simultaneously access the multi-client buffer memory 308. Still further, those of ordinary skill in the art will recognize that multi-client buffer 308 may be logically or physically segmented such that a corresponding portion of buffer 308 is logically/physically associated with each of the plurality of client application interfaces 300 through 306. Each portion of such a segmented buffer may be further segmented such that a first sub-portion is associated with outbound frames generated by the corresponding client application and destined to an associated attached other device and a second sub-portion dedicated to inbound frames received from another device and destined to the corresponding client application. Such memory porting and segmenting options are well known to those of ordinary skill in the art as a matter of design choice in implementing features and aspects hereof.

Multi-client SAS port logic 204 may also include a common transport element 310 comprising logic circuits implementing transport state machine models for each of the supported SAS protocols. Further, multi-client SAS port logic 204 may include state machine logic 312 circuits to implement link layer protocol handling for supported SAS protocols the and logic 314 to implement physical (XL) layer protocols. State machine definitions of each of the protocol layers are well defined in the SAS specifications in section seven thereof. SAS specifications are well known and readily available to those of ordinary skill in the art at, for example, www.t10.org, www.t13.org, and www.serialata.org. Those of ordinary skill in the art will readily recognize standard state machine models defined by the SAS specifications for implementing each of the provided layers of multi-client SAS port logic 204. Design methodologies and exemplary designs for creating logic circuits to implement such a well defined state machine models in the SAS specification are well known to those of ordinary skill in the art.

A key aspect of multi-client SAS port logic 204 is the sharing of lower level link control circuits and logic among the plurality of client application interfaces. Thus, rather than added complexity from additional independent SAS protocol circuits for each supported SAS protocol required by device management client applications, a single shared SAS port is utilized by each of the multiple supported SAS protocols required by the device management client applications. Arbiter/MUX/inbound frame router element 307 helps assure that the shared SAS port logic 204 is properly coupled to an appropriate client application interface and hence to an appropriate client application for proper exchange of management information with other devices.

Numerous particular features may be integrated within the logic of shared SAS port logic 204. In particular, a common set of registers may be provided for SAS port related configuration, control and status information. SAS port related information is generally associated with the present operation status of the present operation of a SAS port as defined by the lower layer protocol management. Since the SAS port logic 204 has a single shared link layer or port so defined, only a single set of registers need be provided to define the current status of the associated SAS port used for device management client applications. Thus features and aspects hereof obviate the need for duplicative registers associated with the control, configuration, and status of multiple such ports where multiple protocol stacks are provided (as discussed above in reference to the prior art of FIG. 4).

Though a common set of registers may define the single SAS port control, configuration, and status, individual register sets are provided for information relating to each application layer interface. Since each application layer interface may be in a different state based upon its interaction with a corresponding client application, an individual set of registers are provided in each client application interface 300 through 306 to define control, configuration, and status information associated with a particular application layer. Such registers may include control signals, status information; interrupt notification and control, and error information. Such register storage elements are well known to those of ordinary skill and the art. Particular control, configuration, and status bits useful for interacting with a SAS port and a client interface are unique to a particular application but are generally well known to those of ordinary skill in the art and are generally suggested by corresponding sections of the SAS specifications.

Arbiter functions within element 307 provide arbitration services for access to the single SAS port for outbound transactions generated by the plurality of client applications (through respective interfaces 300 through 306). Any of several well-known arbitration algorithms and structures may be utilized for such a feature. Multiplexing features within element 307 associated with the arbiter features may then controllably couple one of the plurality of the client application interfaces 302 through 306 to the common SAS port logic for interaction between an associated client application and another device.

Inbound frame routing features of element 307 (as well as router features of element 208) provide logic to determine the destination of a received frame based upon, for example, information received in a SAS open address frame. A SAS open address frame may identify the intended client and hence client application interface through which the received frame is to be directed for processing by an associated client application. A subsequent received information frame may then be appropriately routed by operation of logic in router element 208 and inbound frame router 307. An appropriately selected client application interface 300 through 306 would then direct the received frame to an appropriate client application operable in IOP 200. Such routing and control logic is readily known to those of ordinary skill in the art.

Shared transport layer logic 310, link layer logic 312, and crossbar connection interaction XL element 314 all implement corresponding state machine models as well known and documented in the SAS specifications. In particular, SMP/STP/SSP link logic 312 may implement state machine models as described in sections 7.17, 7.18, and 7.16, respectively, of the SAS specifications. Device management client applications within the enhanced SAS device tend to utilize only a small fraction of the full richness of the corresponding link layer state machine models. Therefore, simplified link layer state machine models may be utilized to implement element 312 (as well as other state machine models of SAS port logic 204). For example, the teachings of the Sibling patent application may be utilized in implementing link layer logic 312 to provide simplified SSP link layer state machine processing as well as other simplified link layer processing.

The block diagram of FIG. 3 is intended merely to suggest an exemplary structure for enhancements within a SAS device to provide features and aspects hereof for simplifying logic associated with multiple client applications operating using multiple SAS protocols within the SAS device. In particular, structure of FIGS. 2 and 3 are intended merely to suggest exemplary embodiments of an enhanced SAS expander (or other enhanced SAS device) operable in accordance with features and aspects hereof to utilize a shared, simplified SAS port to reduce complexity and duplication of circuits within the SAS expander. Numerous equivalent architectures and structures will be readily apparent to those of ordinary skill in the art.

FIGS. 5 through 10 are flowcharts describing methods operable within a SAS device (e.g., a SAS expander) enhanced in accordance with features and aspects hereof to utilize a shared SAS port for multiple protocols to reduce complexity and duplication of SAS protocol management features within the enhanced SAS device. In particular, FIG. 10 broadly represents a method in accordance with features and aspects hereof to utilize a shared SAS port with multiple client application interfaces within enhanced SAS device to perform desired management functions. Element 1000 is first operable to detect a need for a management function associated with another device attached to the enhanced device. Such a need is detected by operation of a management function within the enhanced device desirous of communicating with another device coupled thereto for purposes of managing aspects of the other device. Such management functions may include, for example, initial configuration and setup of a device, troubleshooting a device, reconfiguring a device for optimal performance, etc.

Element 1002 is then operable to controllably couple the client application through a selected client application interface to the shared SAS port and hence to the other device to be managed. Thus the client application interface and associated client application may utilize the single, shared SAS port for exchanging management information with the identified other device. Such controllable selection may involve arbitration to select among the plurality of client application interface circuits to controllably grant temporary exclusive access for the client application and its associated client application interface to the common, shared SAS port.

Element 1004 is then operable to complete the desired exchange of management information with the attached other device. Since the controllably selected client application interface has temporary exclusive access to the common, shared SAS port, management information may be exchanged using the shared SAS port with the other device for purposes of managing aspects of the other device.

As noted above, the shared SAS port logic may include numerous well defined protocol layers implemented as state machine models as specified in the SAS specifications. Further, the shared SAS port logic may include simplified state machine models where the management functions utilized only a limited subset of the full state machine model for its intended management purpose. Still further, the exchange of management information may comprise the exchange of one or more frames with the selected identified other device and one or more open connection requests.

As noted above, a buffer within the shared SAS port logic may be used for completing such exchanges of one or more SAS frames. The buffer may be segmented in a manner that associates a corresponding portion of the buffer with each of a plurality of client applications. Thus the completion of management information exchange may utilize that portion of the segmented buffer associated with the particular client application performing the management information exchange. Still further, completion of the management information exchange may entail receiving frames from the identified other device and routing the received frames to an appropriate client application through a controllably selected client application interface. Logic to identify an intended client application by analyzing a received open address frame and a corresponding received information frame may identify an appropriate client application to further process the received frame. Multiplexing, arbitration, and a routing logic may then direct a received frame into an appropriate portion of a segmented buffer and may appropriately notify the associated client application of the receipt of a new frame.

Lastly, element 1006 is operable to decouple the selected client application interface from the shared SAS port when the desired management information exchange is completed. Thus, another management information exchange may be initiated by the same or another client application or may be initiated by receipt of an unsolicited information frame from an attached other device.

Figure 10:
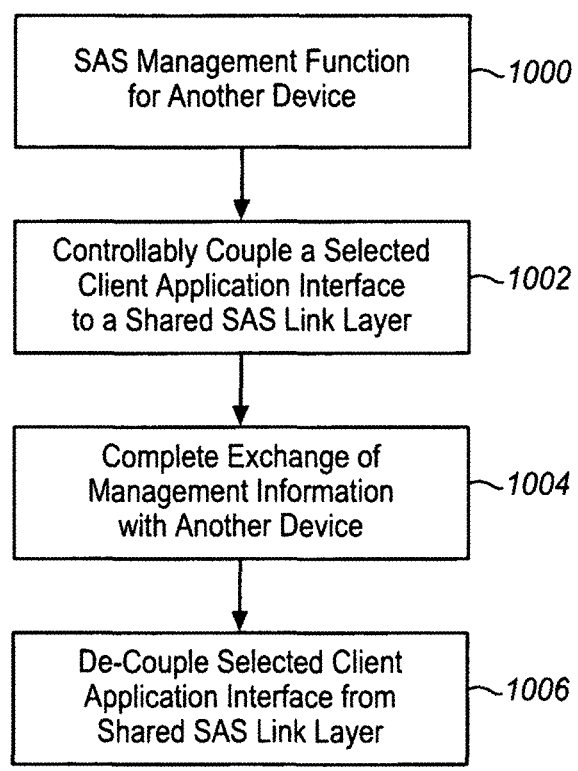

Those of ordinary skill in the art will readily recognize a variety of detailed method steps to implement the broad method described in FIG. 10. Thus, FIG. 10 is intended merely as broadly suggestive of a method in accordance with features and aspects hereof.

FIGS. 5 through 9 provide additional details of protocol specific operations performed by an enhanced SAS expander in accordance with features and aspects hereof. As noted above, aspects of the operation are performed by suitably programmed instructions operability in the I/O processor ("IOP") of the enhanced SAS expander while other steps of the processing are performed by the common, shared SAS port logic. Steps associated with operation of the IOP are so labeled with the prefix "IOP:". Steps not so labeled are performed within the common SAS port logic shared by all client application interfaces.

Figure 5A:
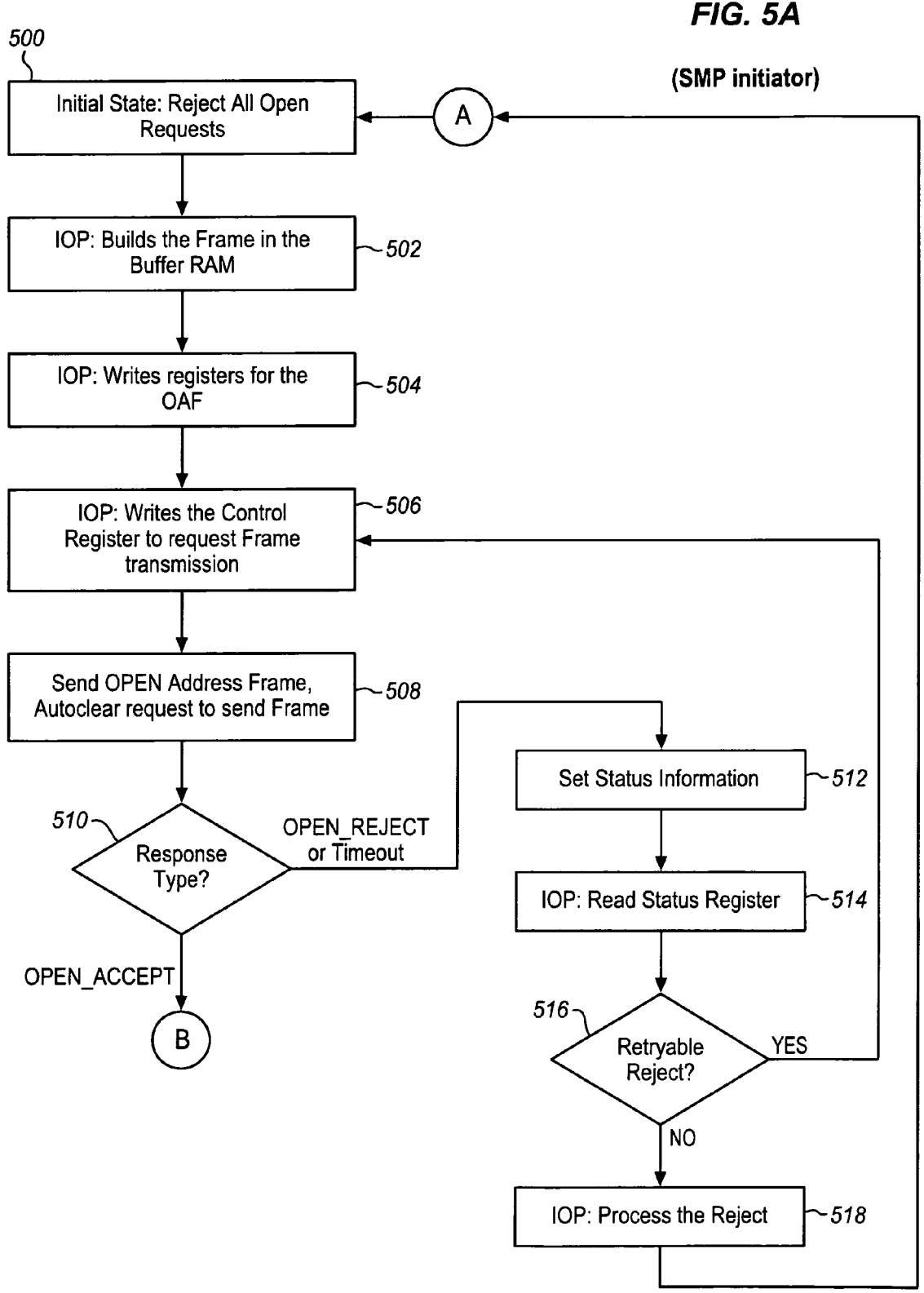
FIGS. 5 through 10 are flowcharts of methods in accordance with features and aspects hereof in which a single multi-client SAS port is used in conjunction with multiple device management client applications in an enhanced SAS device.
Figure 5B:
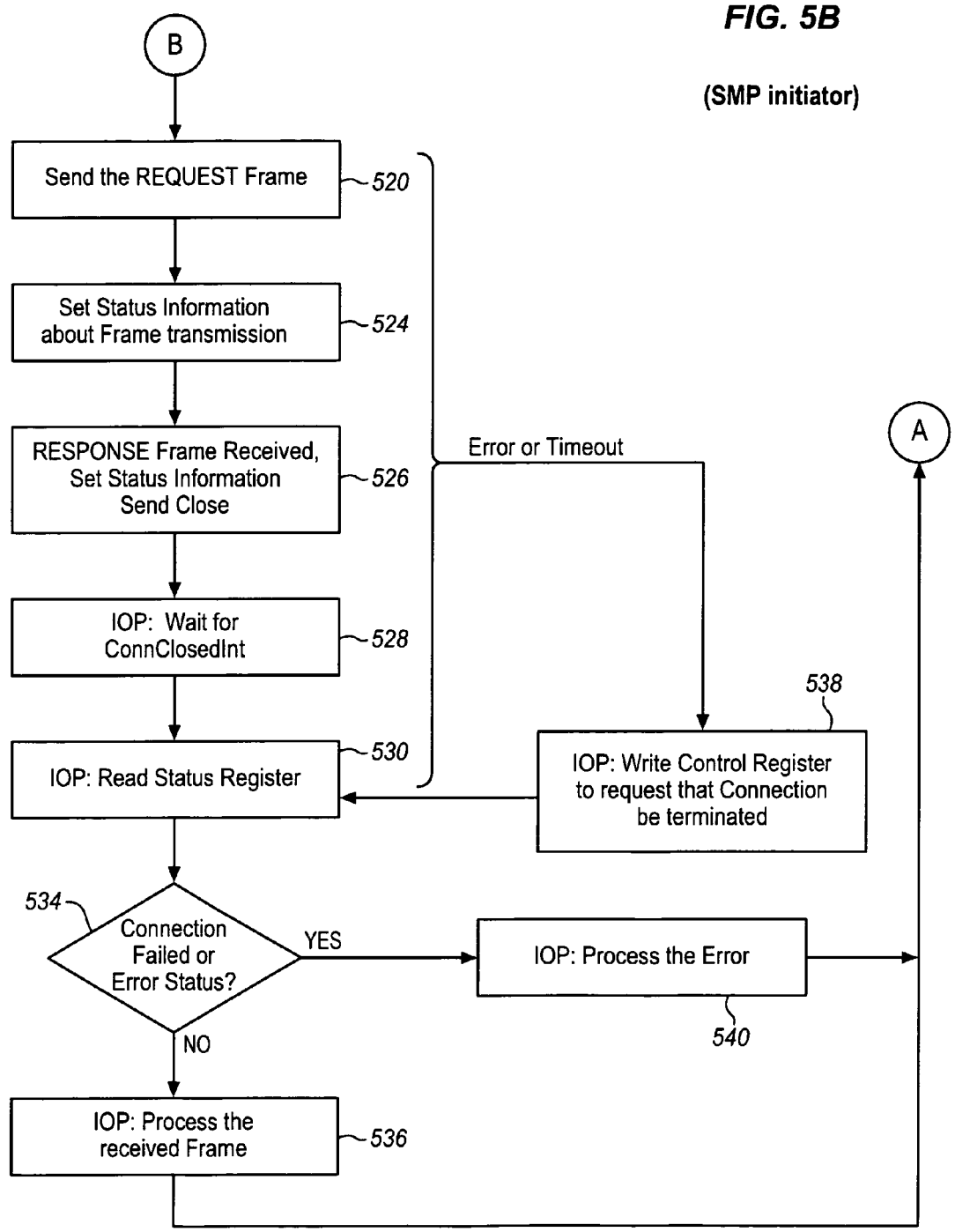

FIGS. 5A and 5B combined represent exemplary processing of a simplified SMP initiator client interface useful for a typical device management function in conjunction with the common, shared SAS port features and aspects hereof. Element 500 indicates an initial status of the SAS port awaiting cooperative processing from a client application operable within the IOP. Element 502 then represents processing in the IOP (e.g., the client application) to build an open address frame and an information frame in the buffer memory associated with the SMP initiator client application interface. As noted above, the buffer memory may preferably be segmented such that a portion of the buffer is specifically designated for interaction with this SMP initiator client application.

Element 504 then represents processing by the IOP to write registers with values associated with the open address frame to be transmitted by the SMP initiator. Element 506 then represents processing within the IOP to write control registers of the shared SAS port to request transmission of the frame loaded in the buffer by operation of element 502 above.

Element 508 then represents processing by the shared SAS port to transmit the open address frame from the buffer built by operation of element 502. Transmission of the open address frame may also automatically clear the send frame control set by operation of element 506 above. Element 508 is also operable to await a response to the transmitted open address frame. A response may be represented as an OPEN_ACCEPT returned from another device in response to the open request. A rejection of the open request is signified by an OPEN_REJECT received or a timeout due to some unexpected link error. If the request to open a connection is accepted, element 510 then directs further processing to element 520 of FIG. 5B (at label B). If the open request is rejected or times out, element 510 directs further processing to element 512 to set status information in the registers of the shared SAS port indicating the particular type of rejection response.

Element 514 then represents processing of the IOP (e.g., the client application) to read the status registers written by element 512. If the rejection is due to some retryable error condition, element 516 continues processing by looping back to element 506 to attempt to open the connection again. Otherwise, element 518 is operable within the IOP to process the rejection of the open request and then continue processing at element 500 reset to an initial state.

If the open request is properly accepted, element 520 (label B) is next operable to send the requested information frame. Element 524 is then operable within the SAS link layer to set the return status regarding the requested information frame transmission. The status information may be programmed into registers readable by the client application operating in the IOP. Element 526 is then operable responsive to receipt of a response frame from the other device. Status information regarding the received response may be programmed into registers readable by the IOP and a close connection request is transmitted to the other device. Element 528 is operable within the IOP to await confirmation that the connection with the other device to be managed has been successfully closed and the information frame properly transmitted. Element 530 then represents processing in the IOP to read status information from the shared SAS port to determine whether the connection and transmission succeeded or failed. If the connection and transmission was successful, element 534 directs further processing to element 536 to process the received frame. If an error was detected, element 534 directs processing to element 540 to process the error in the IOP. In both cases, processing continues looping back to element 500 (label A of FIG. 5A) to start the process anew.

During operation of elements 520 through 530, any error or timeout condition sensed by the IOP causes the IOP at element 538 to write appropriate control information in appropriate control registers to request that the currently open connection be terminated. Processing then continues again at element 530 as above where the IOP reads a status register to determine the success or failure of the open connection request, frame transmission, frame reception, and close connection request.

Figure 6:
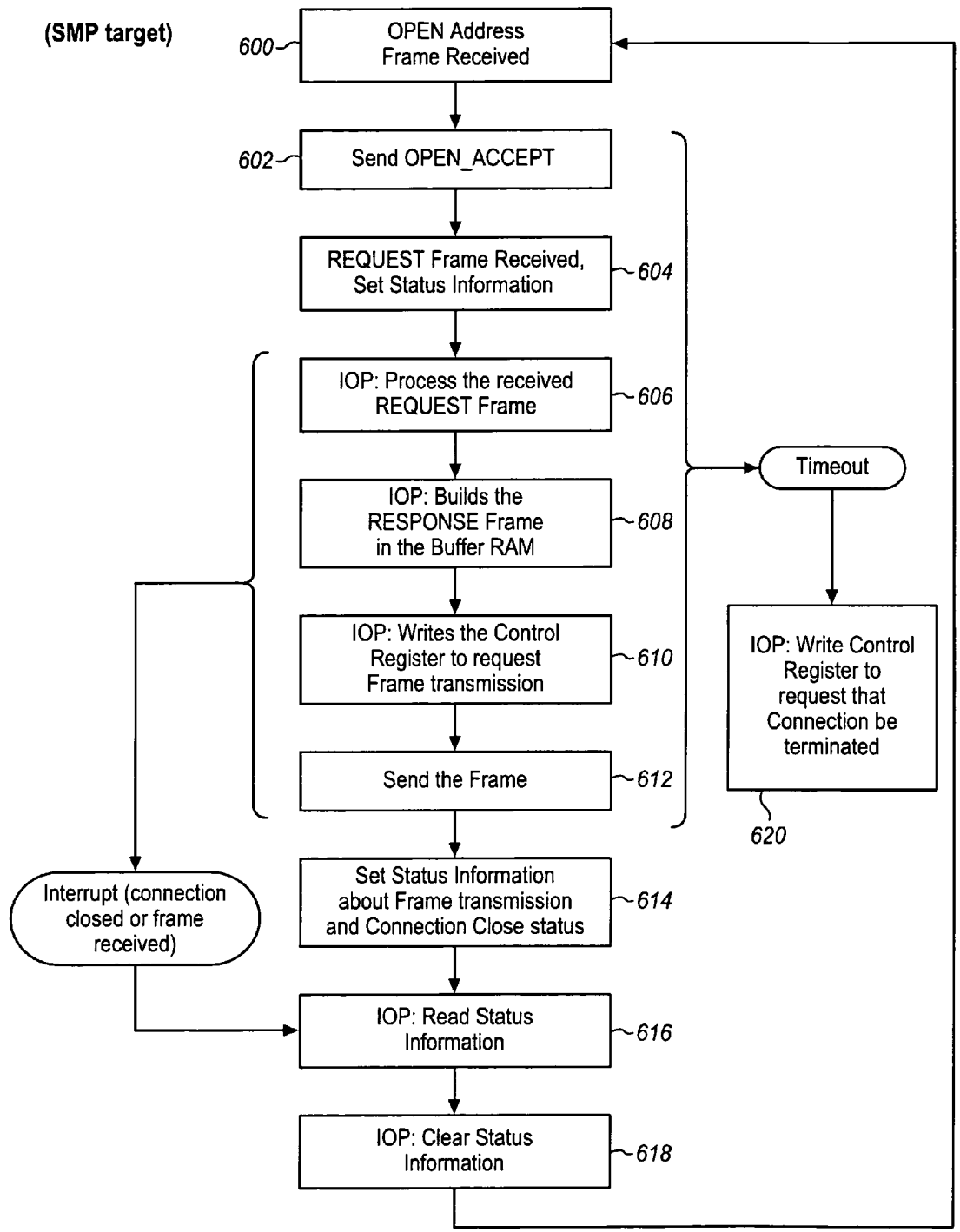

FIG. 6 is a flowchart describing an exemplary method in accordance with features and aspects hereof wherein the client application is operable in an SMP target mode. Such a target mode may be invoked when an unsolicited management information message is transmitted from an attached device destined to a client application operable in the enhanced SAS device (e.g., a SAS expander enhanced in accordance with features and aspects hereof). As above, processing of this SMP target mode is a combination of processing within the IOP (e.g., the client application as indicated by the label "IOP:") and the multi-client SAS port circuits.

Element 600 is operable within the SAS port circuit to receive an open address frame from an attached device indicating a desire by the attached device to open a connection to the SAS expander (specifically to an identified management client application within the enhanced SAS expander). Element 602 is then operable to send an OPEN_ACCEPT primitive to the attached device to accept the requested connection. Element 604 then processes the REQUEST frame received from the other device and sets appropriate status information indicating reception of the received frame. Element 606 operable within the IOP then processes the received frame. In general, the IOP performs such processing responsive to an interrupt generated by the SAS port circuits by operation of any of the elements 600 through 604 indicating that a REQUEST frame has been received. The open address frame information helps identify the intended destination client application for the received REQUEST frame.

Element 608 then represents processing within the IOP to build a RESPONSE frame-responsive to the received REQUEST frame. The REQUEST frame and RESPONSE frame are both preferably resident in a buffer memory of the SAS circuit and typically resident within a portion or segment thereof specifically associated with the SMP client application or even more specifically associated with the SMP target mode. Elements 610 represents processing within the IOP to write control bits of a control register to request transmission of the RESPONSE frame generated in the buffer by operation of element 608. Element 612 then represents processing within the shared SAS port to transmit the frame constructed by the IOP by operation of element 608. Element 614 then represents processing within the SAS link layer to set status information for return to the IOP. The status information may also indicate that the connection is successfully closed as well as the frame successfully transmitted. Element 616 then represents processing by the IOP to read status information regarding the transmission of the RESPONSE frame and closure of the established connection. Element 618 then represents processing of the IOP to clear all status information associated with the frame exchange. Processing then continues looping back to element 600 awaiting a receipt of a next open address frame.

If an interrupt representing premature closure of the connection or unexpected receipt of a frame is sensed during operation of the elements 606 through 612, processing of the IOP may immediately proceed to element 616 within IOP to read status information and appropriately process any unexpected condition. Further, if a timeout condition is sensed by the IOP during processing of any of elements 602 through 614, elements 620 may be operable to write control register information requesting that the connection be terminated prematurely.

Figure 7A:
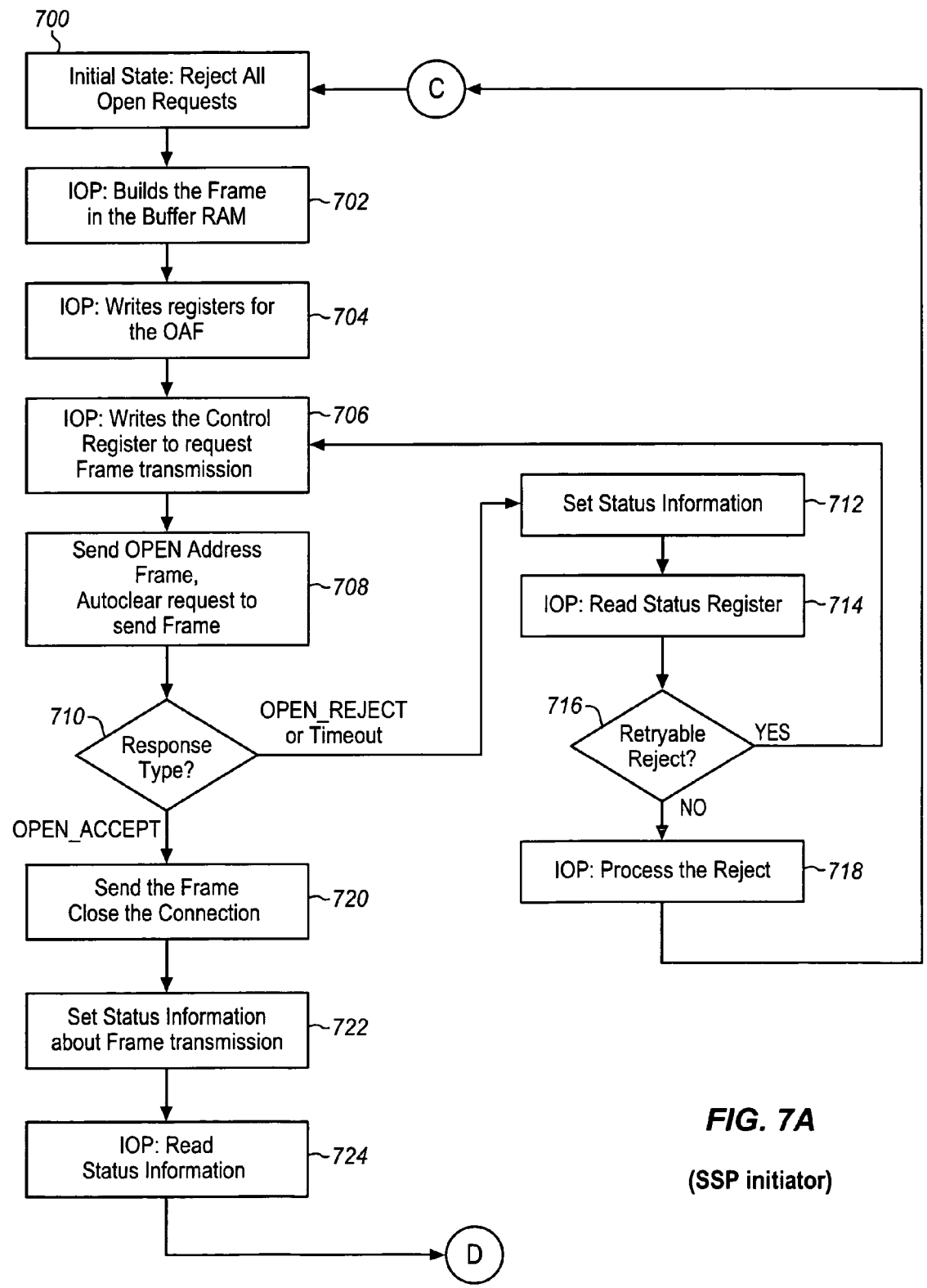
Figure 7B:
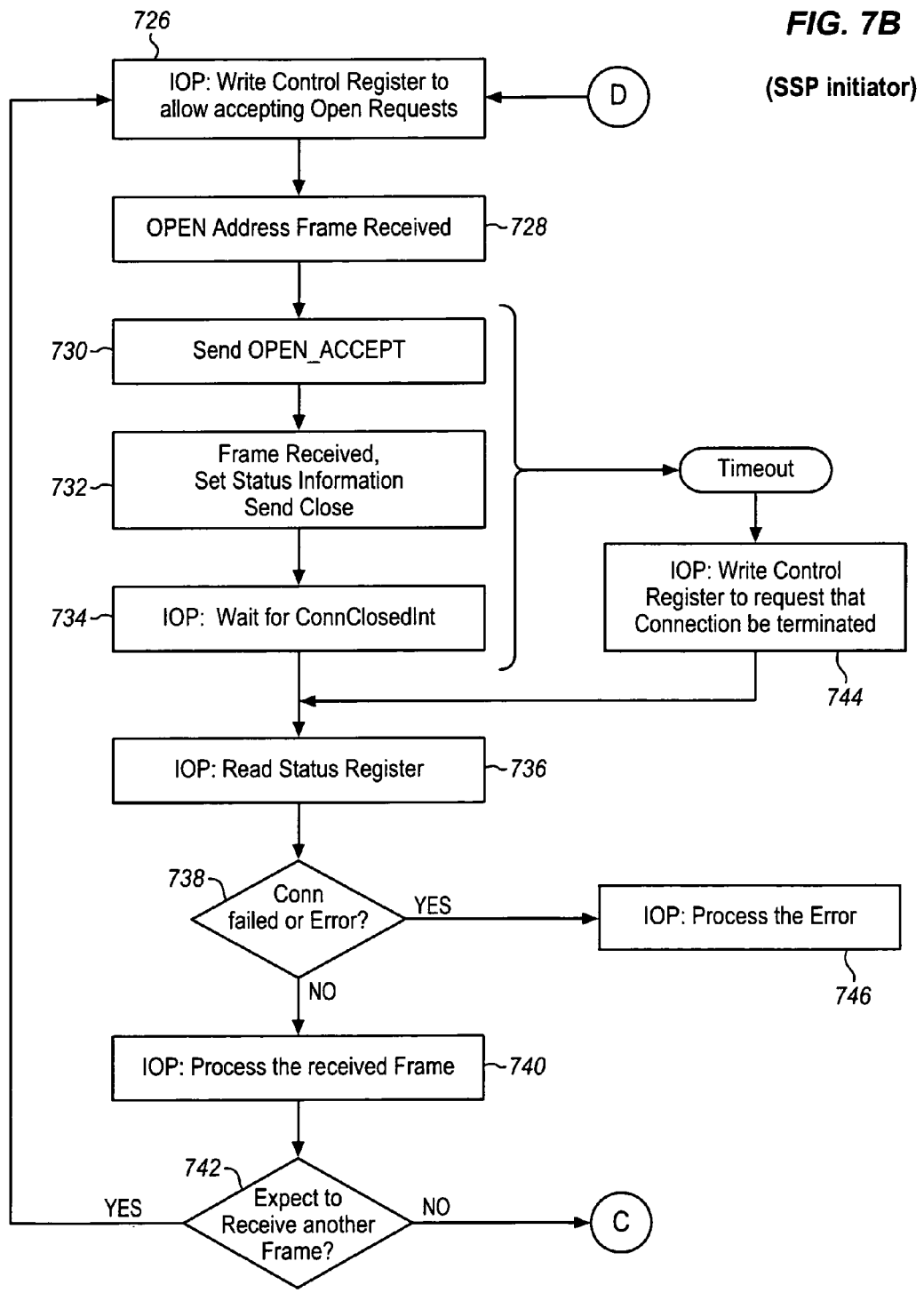

FIGS. 7A and 7B are a flowcharts representing exemplary processing for communications between the client application and a device to be managed using the SSP initiator mode of operation. In general, the SSP protocol is similar to that discussed above with respect to the SMP initiator mode in FIGS. 5A and 5B. A key distinction between the two modes of operation arises from the typical operation in SSP protocol wherein a first request may be transmitted from the initiator to the target but a response may be delayed until further processing within the target device to be managed. Thus, a typical SSP device management client application may open a connection, transmit a request to the device to be managed, close the connection, and then await an open connection request from the managed device in which the managed device will return status and/or data to the initiator. As above with respect to FIGS. 5A, 5B, and 6 processing of FIGS. 7A and 7B comprises processing within the IOP labeled with "IOP:" and other processing within the SAS port logic.

Elements 700 through 718 are essentially identical to operation of elements 500 through 518 as discussed above. The IOP client application and the multi-client SAS port are cooperatively operable to generate an open address frame and to send an information frame to the target device. If the open request is rejected or a timeout is sensed during such an operation, elements 712 through 718 are generally operable as 512 and 518 above in FIG. 5A to attempt to retry of the operation.

Unlike the method of FIG. 5A, if the open address frame is accepted in FIG. 7A, element 720 is operable to close the connection and element 722 records status information in appropriate registers for the IOP indicating success or failure of the transmission. Element 724 then represents processing of the IOP to read the posted status information and element 726 (label D on FIG. 7B) is operable to write an appropriate control bit in registers to configure the SAS port to await an open request from the target device. As noted above, in the SSP protocol as distinct from the SMP protocol, a response from the target device may be significantly delayed such that the connection is disconnected and the target device will reestablish a connection when it is ready to provide the requested information or status. Elements 728 through 732 then represent processing by the multi-client SAS port to indicate that an open address frame has been received from the other device, to accept the open connection request, and to receive an information frame from the other device being managed. Elements 734 through 736 then represent processing within the IOP to await closure of the opened connection and then to read the status register indicating success or failure in receipt of the information frame. Elements 738, 740, and 746 are then operable to determine whether the connection and frame received from the other device resulted in an error and if so to process the error otherwise to process the received frame. Lastly, element 742 determines whether another frame is expected from the other device. If so processing continues at element 726 otherwise processing loops back to element 700 at label C of FIG. 7A to await another open connection request and transmitted frame from the other device being managed.

If during processing of elements 730 through 734 the IOP detects a timeout condition waiting for the device being managed to respond to the earlier transmitted frame, element 744 is operable set a control register in the multi-client SAS port to cause immediate termination of the open connection. Processing then continues at element 736 as described above.

Figure 8B:
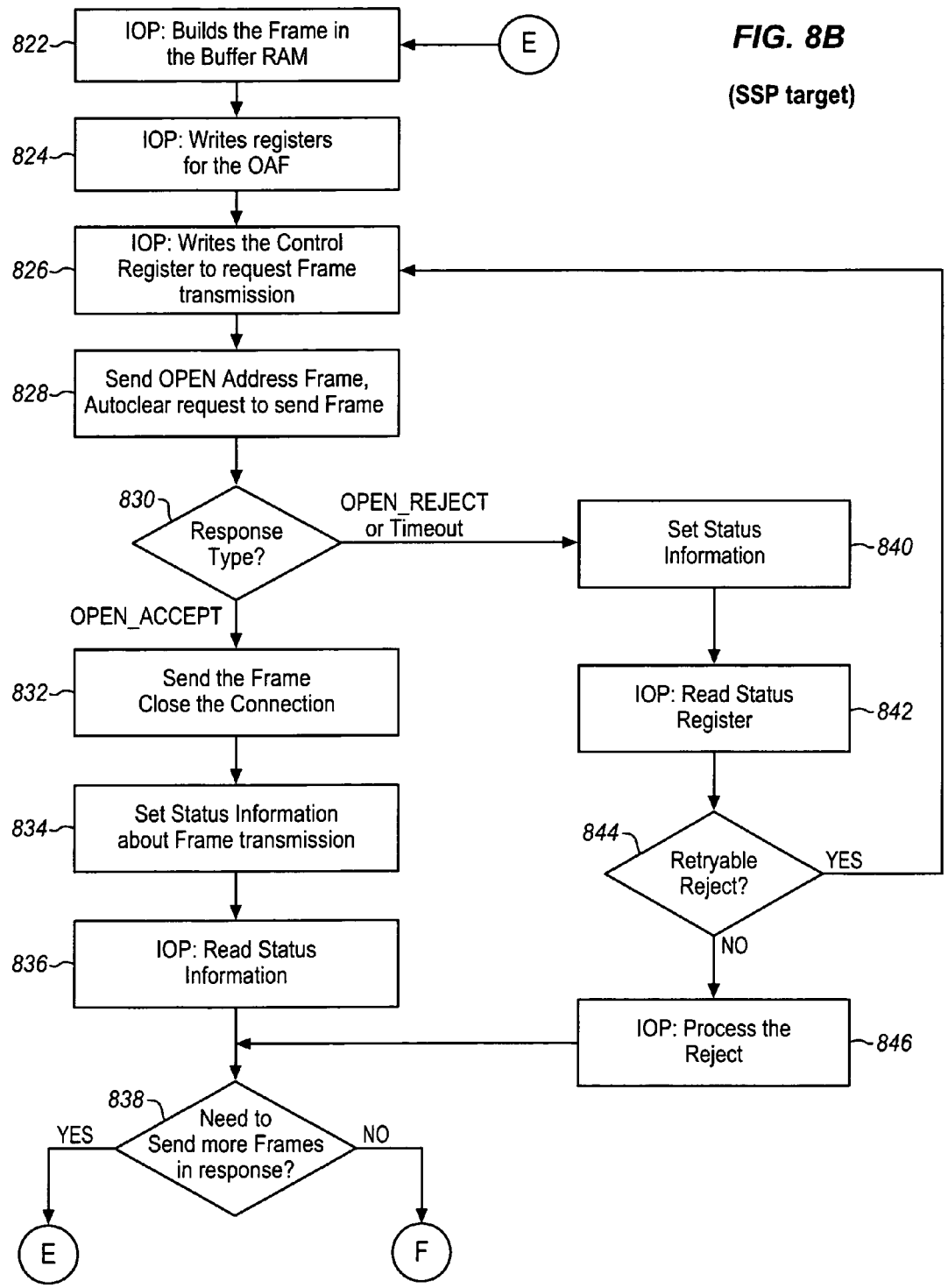

FIGS. 8A and 8B represent exemplary processing of an SSP target mode operation in device management. SSP target mode operation may be useful in management of a SCSI device where the other device needs to inform the device management client application of an unexpected event or status change. SSP target mode operation is similar to the SMP target mode operation discussed above with respect to FIG. 6 but, as for any SCSI device communication, connections may be established, disconnected, and reconnected based on delays within either of the communicating components.

Element 800 represents an initial state. Element 802 is operable within the IOP such that the client application may allow itself to be addressed as a target SCSI device. Elements 804 through 812 are then operable similar to steps discussed above in FIG. 6 to receive an open address frame, accept the open request, and receive the information frame associated therewith. The connection is then closed by the IOP and the status of the open connection and of the frame reception is then evaluated. Elements 814, 816, and 850 are then operable to detect whether the connection and frame reception resulted in any failure or were both successful. If successful, the IOP reads and processes the received frame at element 816. If the connection or frame reception failed in some manner the IOP processes the error at element 850. In both cases, element 818 then determines whether another frame is expected from the device being managed and if so continues processing at element 802 to await a next open address frame to establish a new connection.

If no further frame is expected from the managed device, element 820 is operable within the multi-client SAS port to determine whether a frame need be transmitted in response to the received information. If not, processing loops back to element 800 to continue processing. Otherwise, processing continues at 822 of FIG. 8B (label E).

Elements 822 through 826 are operable within the IOP to build an appropriate response frame in the buffer memory and to configure registers of the multi-client SAS port to cause transmission of the constructed frame. The multi-client SAS port is operable in accordance with elements 828, 830 through 834, and 840 to send the open address frame and associated information frame to the device to be managed. If the open address frame is rejected, element 830 continues processing with element 840 through 846 to return status information to the IOP and, if possible, retry the rejected open request or otherwise process the rejection error. If the open request is properly accepted and associated information frame is transmitted by the multi-client SAS port the IOP verifies property transmission thereof. If more frames need to be sent to the device to be managed, processing continues looping back to element 822 (label E) to continue transmitting more frames with further open connection requests. If no further frames need be transmitted, processing continues at label F looping back to element 800 of FIG. 8A. As above, if the IOP client application senses a timeout in waiting for actions in elements 806 through 810, element 848 may write a control register in the SAS port to immediately terminate the open connection.

Figure 9A:
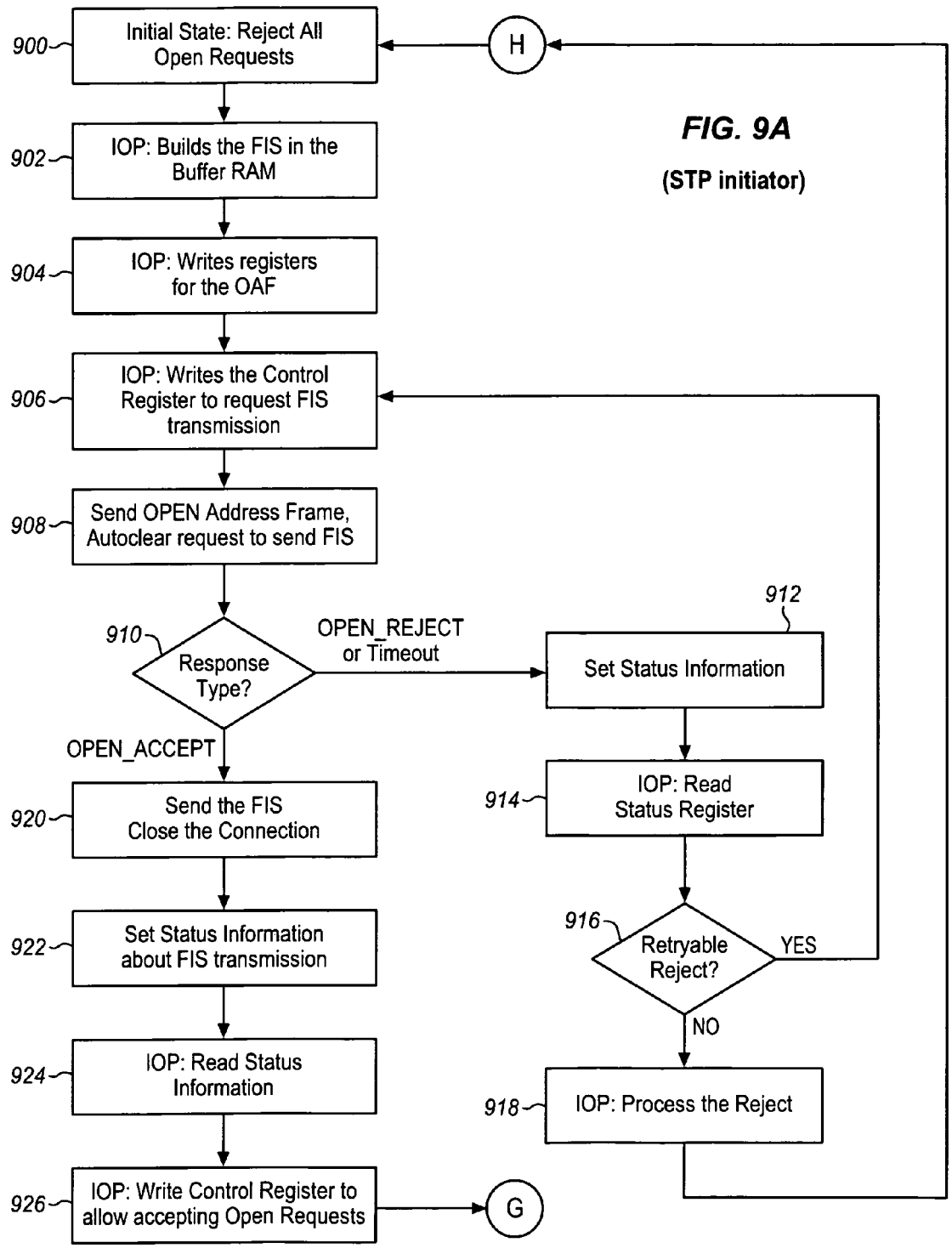
Figure 9B:
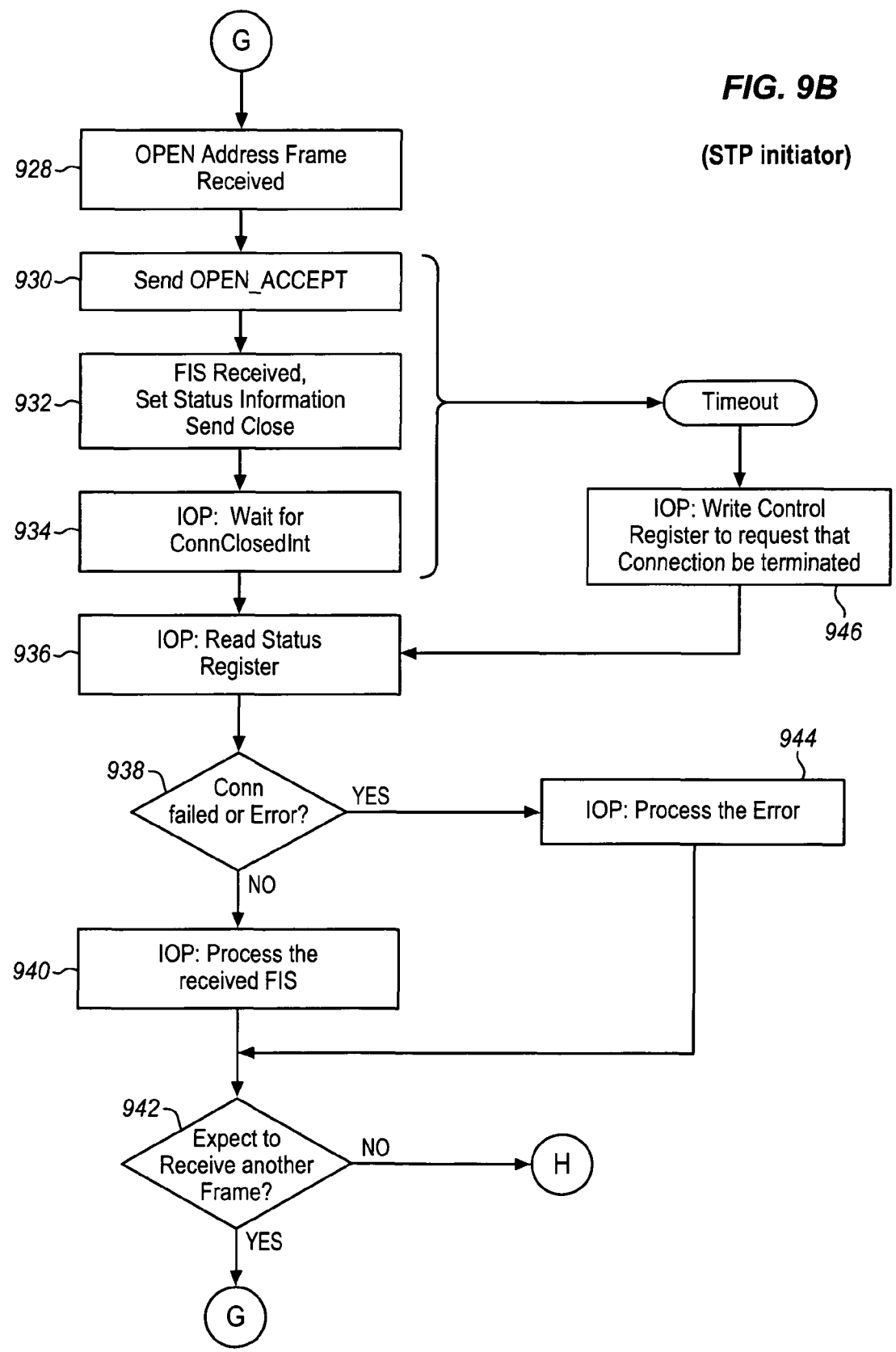

FIGS. 9A and 9B are flowcharts similar to that of FIGS. 5A and 5B and FIGS. 7A and 7B but describing an exemplary embodiment in which a client application utilizes the multi-client SAS port as an STP initiator in a device management transaction. Those of ordinary skill in the art will readily recognize similarity between the STP initiator utilization of the multi-client SAS port as described in FIGS. 9A and 9B and that of an SSP initiator client application as described above in FIGS. 7A and 7B. Slight variations in the sequencing are described in the figures relevant only to the difference between an STP transaction and an SSP transaction. A review of the figures for one of ordinary skill in the art is all that is required to understand the sequence of processing in FIGS. 9A and 9B relative to the other figures already discussed.

Those of ordinary skill in the art will readily recognize that the specific transactions and modes of operation described by elements of FIGS. 5 through 9 are intended merely as exemplary of possible embodiments of features and aspects hereof. Key to the invention is that despite some differences in the particular client application interactions, the common, shared multi-client SAS port may be utilized effectively in all such modes of operation. By sharing the multi-client SAS port among the plurality of client applications through a corresponding plurality of client application interface elements, duplication and complexity of prior techniques having multiple circuits each for a corresponding protocol stack is substantially reduced thereby providing a simpler, more cost effective solution for an enhanced SAS device (e.g. enhanced SAS expander) adapted to provide device management features for other attached devices.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A Serial Attached Small Computer Systems Interface (SAS) expander operable to couple initiators with targets via the SAS protocol, the SAS expander comprising:
    a Serial Management Protocol (SMP) application interface;
    a Serial ATA Tunneled Protocol (STP) application interface;
    a Serial SCSI Protocol (SSP) application interface; and
    a single SAS port module that comprises an arbiter,
    wherein the SAS port module is operable to establish a SAS connection between a first of the initiators and a first of the targets,
    wherein the arbiter is operable to process a SAS Open Address Frame from the first target, to determine which of the SMP application interface, the STP application interface, and the SSP application interface will process subsequent SAS frames between the first initiator and the first target based on the SAS Open Address Frame, to process a subsequent SAS frame between the first initiator and the first target, and to route the subsequent SAS frame between the first initiator and the first target according to the determined application interface.

2. The SAS expander of claim 1, wherein:
    the arbiter is further operable to arbitrate between simultaneous connection requests from the initiators for the first target.

3. The SAS expander of claim 1, wherein:
    the SSP application interface comprises a target application interface and an initiator application interface.

4. A method operable in a Serial Attached Small Computer Systems Interface (SAS) expander to couple initiators with targets via the SAS protocol, the method comprising:
    establishing a SAS connection between a first of the initiators and a first of the targets through a single SAS port module of the expander via an arbiter, thus granting temporary exclusive access to the single SAS port; and
    via the arbiter of the SAS port module:
    processing a SAS Open Address Frame from the first target;
    determining which of a Serial Management Protocol (SMP) application interface, a Serial ATA Tunneled Protocol (STP) application interface, and a Serial SCSI Protocol (SSP) application interface will process subsequent SAS frames between the first initiator and the first target based on the SAS Open Address Frame;
    processing a subsequent SAS frame between the first initiator and the first target; and
    routing the subsequent SAS frame between the first initiator and the first target according to the determined application interface.

5. The method of claim 4, further comprising:
    arbitrating, via the arbiter, between simultaneous connection requests from the initiators for the first target.

6. The method of claim 4, wherein:
    the SSP application interface comprises a target application interface and an initiator application interface.

7. A non-transitory computer readable medium comprising instructions that, when executed by a processor within a Serial Attached Small Computer Systems Interface (SAS) expander, direct the processor to couple initiators with targets via the SAS protocol, the computer readable medium further comprising instructions that direct the processor to:
    establish a SAS connection between a first of the initiators and a first of the targets through a single SAS port module of the expander via an arbiter, thus granting temporary exclusive access to the single SAS port; and direct the arbiter of the SAS port module to:

process a SAS Open Address Frame from the first target;

determine which of a Serial Management Protocol (SMP) application interface, a Serial ATA Tunneled Protocol (STP) application interface, and a Serial SCSI Protocol (SSP) application interface will process subsequent SAS frames between the first initiator and the first target based on the SAS Open Address Frame;

process a subsequent SAS frame between the first initiator and the first target; and route the subsequent SAS frame between the first initiator and the first target according to the determined application interface.

8. The computer readable medium of claim 7, further comprising instructions that direct the processor to:

direct the arbiter to arbitrate between simultaneous connection requests from the initiators for the first target.

9. The computer readable medium of claim 7, wherein:

the SSP application interface comprises a target application interface and an initiator application interface.

* * * * *